United States Patent
Ritzer et al.

(10) Patent No.: US 10,820,493 B2
(45) Date of Patent: Nov. 3, 2020

(54) GROUND WORKING SYSTEM WITH SIGNAL ADAPTATION

(71) Applicant: Andreas Stihl AG & Co. KG, Waiblingen (DE)

(72) Inventors: Peter Ritzer, Ebbs (AT); Sebastian Matt, Kufstein (AT); Samuel Zoettl, Birgitz (AT)

(73) Assignee: Andreas Stihl AG & Co. KG, Waiblingen (DE)

( * ) Notice: Subject to any disclaimer, the term of this patent is extended or adjusted under 35 U.S.C. 154(b) by 46 days.

(21) Appl. No.: 15/997,346

(22) Filed: Jun. 4, 2018

(65) Prior Publication Data

US 2018/0352728 A1 Dec. 13, 2018

(30) Foreign Application Priority Data

Jun. 9, 2017 (EP) .................................. 17400031

(51) Int. Cl.
*A01D 34/00* (2006.01)
*G05D 1/02* (2020.01)
(Continued)

(52) U.S. Cl.
CPC ......... *A01D 34/008* (2013.01); *G05D 1/0016* (2013.01); *G05D 1/0022* (2013.01);
(Continued)

(58) Field of Classification Search
CPC .. A01D 34/008; A01D 2101/00; A01D 69/02; A01D 34/64; A01D 69/007;
(Continued)

(56) References Cited

U.S. PATENT DOCUMENTS

| 8,106,626 B2 | 1/2012 | Li et al. |
| 2005/0230166 A1 | 10/2005 | Petersson et al. |

(Continued)

FOREIGN PATENT DOCUMENTS

| DE | 202013101894 U1 | 9/2014 |
| DE | 102015114568 A1 | 3/2017 |

(Continued)

OTHER PUBLICATIONS

Anonymous: "Husgvama Automower 230 ACX, Reviews—Product Review.com.au", May 18, 2016, XP055425034, pp. 1 to 10, URL:https://www.productreview.com.au/p/husqvarna-automower-230acx-220ac-210c/m/230acx.html.

(Continued)

*Primary Examiner* — Yuen Wong
(74) *Attorney, Agent, or Firm* — Walter Ottesen, P.A.

(57) ABSTRACT

A ground working system includes at least one self-driving ground working device, which has a drive and a control unit. An operating region (A) is bounded by a wire, wherein the ground working device travels along a traveling path (W) determined by the control unit in the operating region (A). A base station has a transmission unit, which is electrically connected to the wire and by which a wire signal is transmitted. The wire signal transmitted on the wire is electrically received by a reception unit of the base station, compared with a predetermined setpoint signal and, in the event of a deviation of the electrically received wire signal from the predetermined setpoint signal, the transmitted wire signal is changed.

10 Claims, 3 Drawing Sheets

(51) Int. Cl.
*G05D 1/00* (2006.01)
*A01B 69/04* (2006.01)
*A01D 34/64* (2006.01)
*A01D 69/02* (2006.01)
*A01D 101/00* (2006.01)

(52) U.S. Cl.
CPC .......... G05D 1/0265 (2013.01); *A01B 69/008* (2013.01); *A01D 34/64* (2013.01); *A01D 69/02* (2013.01); *A01D 2101/00* (2013.01); *G05D 2201/0208* (2013.01)

(58) Field of Classification Search
CPC .. G05D 1/0265; G05D 1/0022; G05D 1/0016; G05D 2201/0208; A01B 69/008; H04B 5/0075; H04B 5/0031; H04B 5/0018
See application file for complete search history.

(56) References Cited

U.S. PATENT DOCUMENTS

| | | |
|---|---|---|
| 2011/0153172 A1 | 6/2011 | Anderson |
| 2011/0202307 A1* | 8/2011 | Petereit .............. A01D 34/008 702/150 |
| 2012/0158236 A1 | 6/2012 | Chung et al. |
| 2013/0006418 A1 | 1/2013 | Tian et al. |
| 2014/0324246 A1* | 10/2014 | Biber .................. G05D 1/0219 700/302 |
| 2015/0328775 A1 | 11/2015 | Shamilian et al. |
| 2016/0014955 A1 | 1/2016 | Hans |
| 2017/0020064 A1 | 1/2017 | Doughty et al. |
| 2017/0215336 A1 | 8/2017 | Andriolo et al. |
| 2018/0255704 A1 | 9/2018 | Kamfors et al. |
| 2018/0303031 A1 | 10/2018 | Araki et al. |
| 2018/0352729 A1 | 12/2018 | Matt et al. |
| 2018/0352733 A1 | 12/2018 | Matt et al. |
| 2018/0352734 A1 | 12/2018 | Matt et al. |
| 2018/0353040 A1 | 12/2018 | Matt et al. |

FOREIGN PATENT DOCUMENTS

| | | |
|---|---|---|
| EP | 1906205 A1 | 4/2008 |
| EP | 1933467 A2 | 6/2008 |
| EP | 2269433 A1 | 1/2011 |
| EP | 2390741 A2 | 11/2011 |
| EP | 2656718 A1 | 10/2013 |
| EP | 2658073 A1 | 10/2013 |
| EP | 2667271 A1 | 11/2013 |
| EP | 2945037 A2 | 11/2015 |
| EP | 3069593 A1 | 9/2016 |
| WO | 03104908 A1 | 12/2003 |
| WO | 2013/141206 A1 | 9/2013 |
| WO | 2014158060 A1 | 10/2014 |
| WO | 2015072897 A1 | 5/2015 |
| WO | 2016102143 A1 | 6/2016 |
| WO | 2016103068 A1 | 6/2016 |
| WO | 2016178616 A1 | 11/2016 |
| WO | 2018060966 A1 | 4/2018 |

OTHER PUBLICATIONS

Anonymous: "Rasenmaeher Roboter Signalverstaerker", May 17, 2016, XP055425027, pp. 1 to 7, URL:https://web.archive.org/web/20160517003655/http://robomaeher.de/blog/rasenmaher-roboter-signalverstarker/.

* cited by examiner

GROUND WORKING SYSTEM WITH SIGNAL ADAPTATION

CROSS REFERENCE TO RELATED APPLICATION

This application claims priority of European patent application no. 17 400 031.5, filed Jun. 9, 2017, the entire content of which is incorporated herein by reference.

FIELD OF THE INVENTION

The invention relates to a ground working system including at least one self-driving ground working device, which has a drive and a control unit. An operating region bounded by an edge boundary wire is provided, wherein the ground working device travels along a traveling path determined by the control unit in the operating region. A base station with a transmitter unit, which is connected to the electrical edge boundary wire and via which a wire signal is transmitted on the edge boundary wire, is provided. The electromagnetic field of the wire signal will induce in a reception coil of the ground working device a reception signal, which is processed in the control unit for determining the traveling path and the traveling behavior.

BACKGROUND OF THE INVENTION

Bounding the operating region for a ground working device by a physical laid wire has proven successful in practice. Increasingly larger operating regions are set out in a functionally reliable way by such an edge boundary, while differently formed operating regions can also be connected by passageways. In such an overall operating region enclosed by a wire, not only a single ground working device but also multiple ground working devices can be used. In the case of multiple ground working devices, the overall operating time of the ground working system is advantageously reduced while obtaining the same working result.

Each wire physically laid as an edge boundary first has ohmic properties and, depending on the form in which it is laid and the passageways that are laid, also inductive or capacitive properties. Therefore, a wire signal applied to the wire is attenuated over the overall length of the wire. The wire signal changes in amplitude and signal shape on the basis of the geometrical and electrical properties of the wire. Therefore, proper control of the ground working devices may be impaired, in particular when they are at a relatively great distance from the wire.

When operating a ground working system, legal requirements also have to be met. For instance, the transmitted wire signals cannot be of any strength whatsoever, since their electromagnetic field would impair the function of other, for example adjacent, ground working systems. If on the other hand the wire signal is made electrically too weak, interference signals occurring in the vicinity of the ground working device may impair the functional reliability of the operation of the ground working devices.

SUMMARY OF THE INVENTION

It is an object of the invention to configure a ground working system with a wire as an edge boundary of an operating region in such a way that on the one hand there is a wire signal that is strong enough for the faultless functioning of the ground working devices over the entire length of the wire of an edge boundary and on the other hand an electromagnetic impairment of the vicinity is minimized.

The above object can, for example, be achieved by a ground working system comprising: at least one self-driving ground working device having a drive, a reception coil and a control unit; a wire delimiting an operating region (A); the at least one self-driving ground working device being configured to travel along a traveling path (W) determined by the control unit in the operating region (A); a base station having a transmission unit configured to be electrically connected to the wire and via which a wire signal can be transmitted on the wire, wherein the wire signal generates an electromagnetic field and the electromagnetic field of the wire signal induces a reception signal in the reception coil of the at least one self-driving ground working device; the control unit being configured to process the reception signal; the base station having a reception unit for electrically receiving the wire signal transmitted on the wire as a received wire signal; wherein the received wire signal is compared with a predetermined setpoint signal; and, wherein, in the event of a deviation of the electrically received wire signal from the predetermined setpoint signal, the wire signal transmitted on the wire is changed.

The wire signal transmitted on the wire of the edge boundary is electrically received by a reception unit of the base station, in particular parallel to the transmission unit. This received wire signal is compared with a predetermined setpoint signal, in order in the event of a deviation of the received wire signal from the predetermined setpoint signal to change the transmitted wire signal. In a particular configuration, the received wire signal is changed in such a way that it approximates to the predetermined setpoint signal or, in particular, corresponds to it.

It should be emphasized that the reception unit electrically picks up the transmitted wire signal at the same time it is transmitted by the wire, so that the transmitted wire signal is at the same time measured in the reception unit. The reception unit and the transmission unit are provided in the same base station and operate independently of the length of the wire and of the laid geometrical form of the wire. No inputs by the user have to be entered with respect to the laid edge boundary, the length of the laid wire or the distance between parallel running sections of wire. It is also possible to dispense with sensors, for example for sensing the electromagnetic field. The base station optimally adapts the transmitted wire signal automatically, without interventions by the user.

The signal adaptation of the transmitted wire signal allows the attenuation of the wire signal, in particular the ohmic, inductive and/or capacitive influencing factors of the wire laid as the edge boundary, to be compensated to a great extent. Thus, the wire signal to be transmitted can be adapted in its amplitude, its signal shape and/or in its variation over time via the signal processing device.

The predetermined setpoint signal does not necessarily have to correspond to the transmitted wire signal. Rather, the transmitted wire signal and the predetermined setpoint signal may differ in amplitude and/or signal shape. It may also be expedient to make a selection of admissible setpoint signals available to the signal processing device. The signal processing device can decide depending on the established deviations of the received wire signal from a predetermined setpoint signal which signal shape, signal strength and signal time is advantageous for the wire loop that is connected. Thus, every wire laid in situ in whatever form desired can be operated as an edge boundary with an optimum wire signal—without a user having to intervene—whereby a failsafe control of the ground working devices is ensured in the entire operating region.

The wire of the edge boundary is physically laid as a wire loop, wherein the wire loop is electrically connected at its connection ends to a transmission unit. The transmission unit is expediently connected electrically parallel to the transmission unit to the wire of the edge boundary. The connection ends of the wire loop are electrically connected to the reception unit in a simple way. In an embodiment, the transmission unit and the reception unit communicate with one another via a signal processing device. The transmission unit, the wire of the edge boundary, the reception unit and the signal processing device form a control circuit.

Depending on the established deviations between the received wire signal and the predetermined setpoint signal, the signal processing device determines whether the wire signal to be transmitted has to be changed, for example increased in its amplitude, changed in its signal shape or adapted in its variation over time, such as for example in frequency.

In an advantageous embodiment, the base station is at the same time configured as a charging station for a battery of the ground working device. To this end, the ground working device enters the base station as a charging station when the in-device battery is at a correspondingly low state of charge.

The ground working device is advantageously a self-driving lawnmower.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
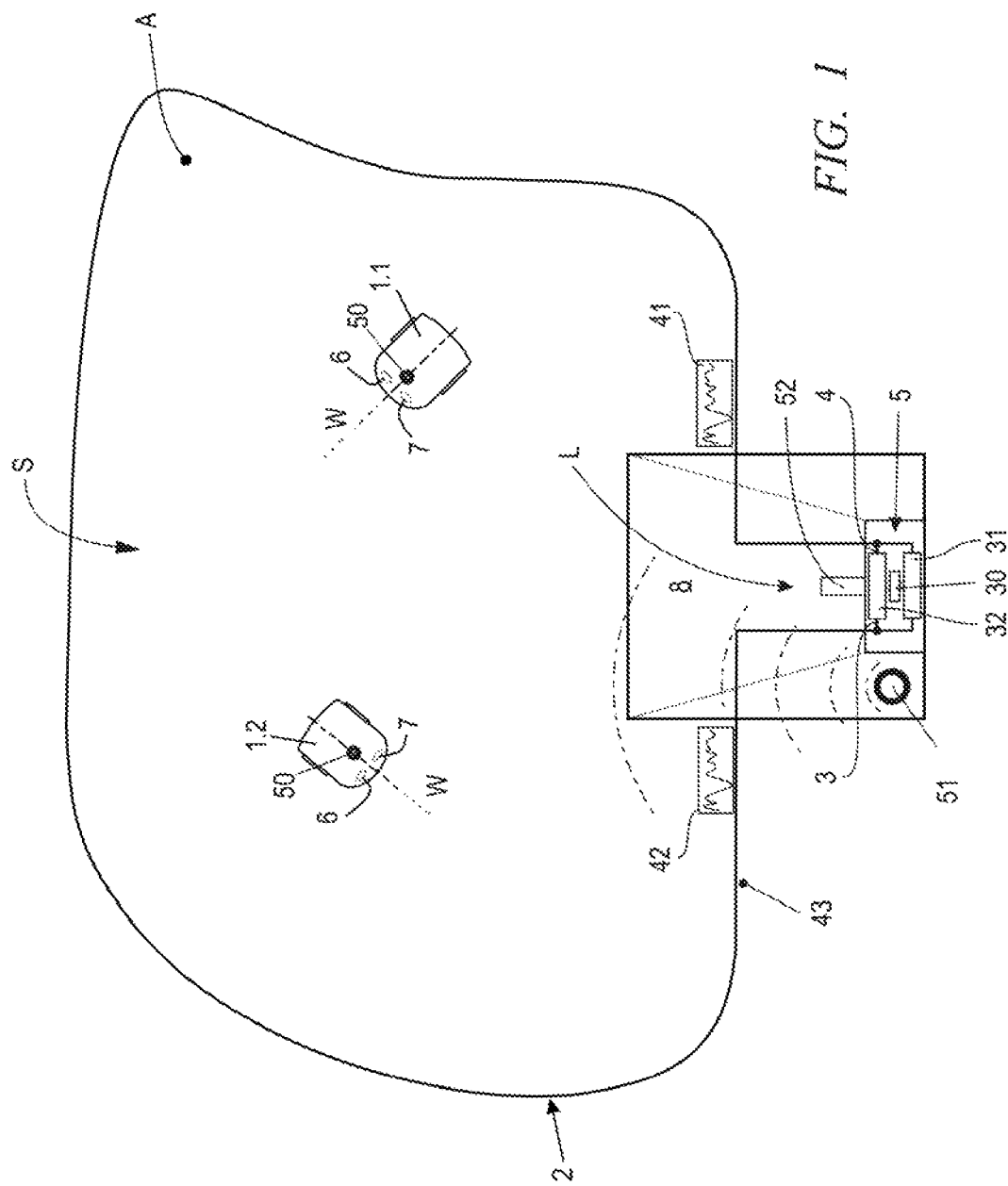
FIG. 1 shows in a schematic representation a ground working system having multiple ground working devices driving themselves in an operating region.

The ground working system S represented in FIG. 1 includes at least one self-driving ground working device 1.1, 1.2 for working a predetermined operating region A. In the embodiment shown, two ground working devices 1.1 and 1.2 are provided for the combined working of the operating region A. The ground working system S may include fewer or more ground working devices. Each individual ground working device 1.1, 1.2 operates autonomously and travels automatically within the operating region A along a random, predetermined or automatically planned traveling path W.

In the embodiment shown, as in FIG. 1, the operating region A of the ground working system S is bounded by a wire 43. The wire 43 forms an edge boundary of the operating region A and is laid in particular as a closed wire loop 2. The connection ends 3 and 4 of the wire loop 2 are connected to a transmission/reception unit 5 of a base station 8. As FIG. 1 shows, connection ends 3 and 4 of the wire 43 are connected to a transmission unit 32. Via the transmission unit 32, electrical wire signals 41 are transmitted—preferably at fixed time intervals—on the wire 43 of the edge boundary.

In particular electrically parallel to the reception unit 32, the connection ends 3 and 4 of the wire 43 of the wire loop 2 are connected to a transmission unit 31, which electrically receives the wire signal 41 transmitted onto the wire 43 of the edge boundary.

The reception unit 31 and the transmission unit 32 are connected to one another via a signal processing device 30.

Figure 3:
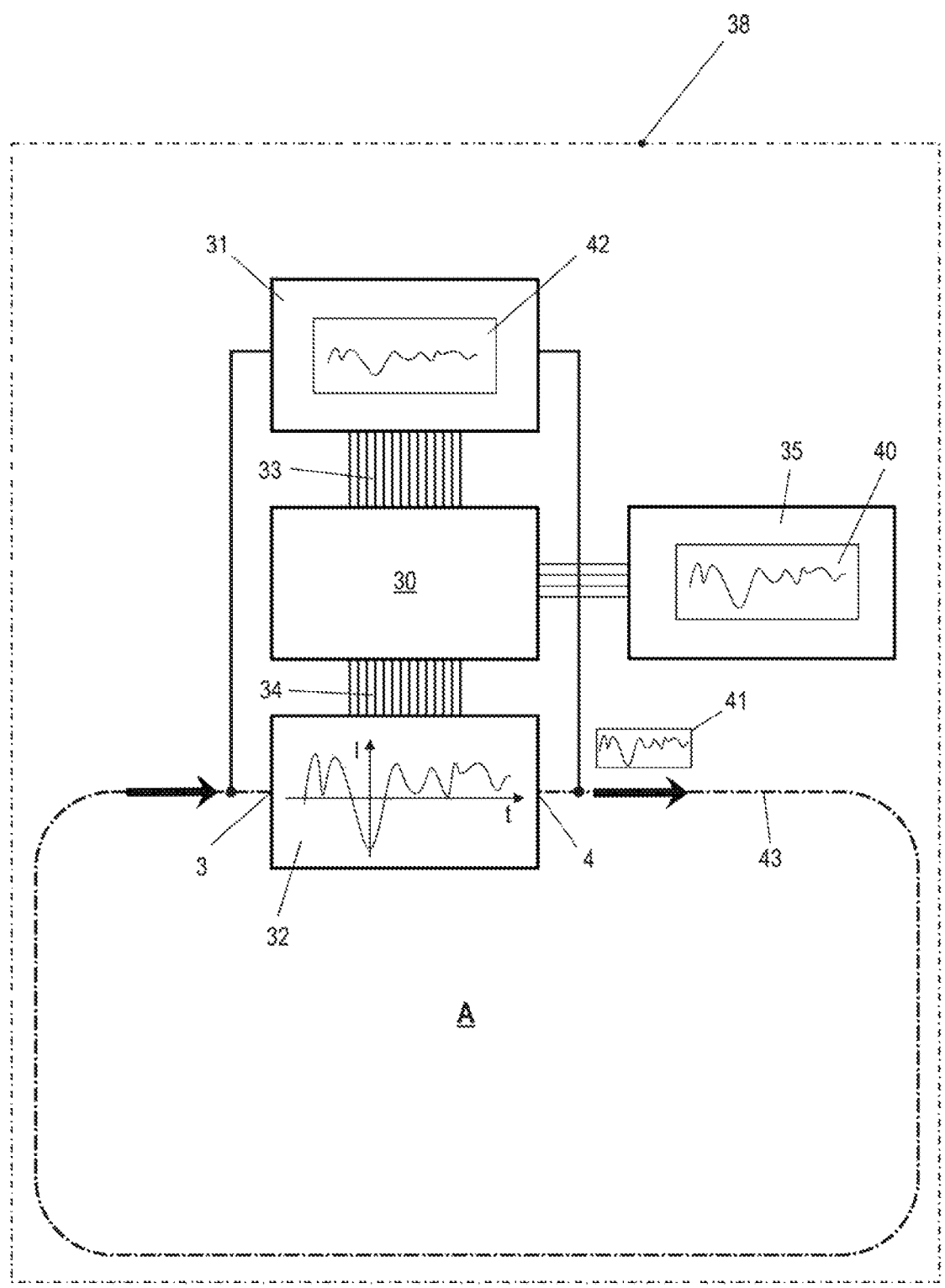

The reception unit 31, the signal processing device 30 and the transmission unit 32 together with the wire of the closed wire loop 2 form a control circuit 38 (FIG. 3). The function of the control circuit 38 is specifically described below.

Figure 2:
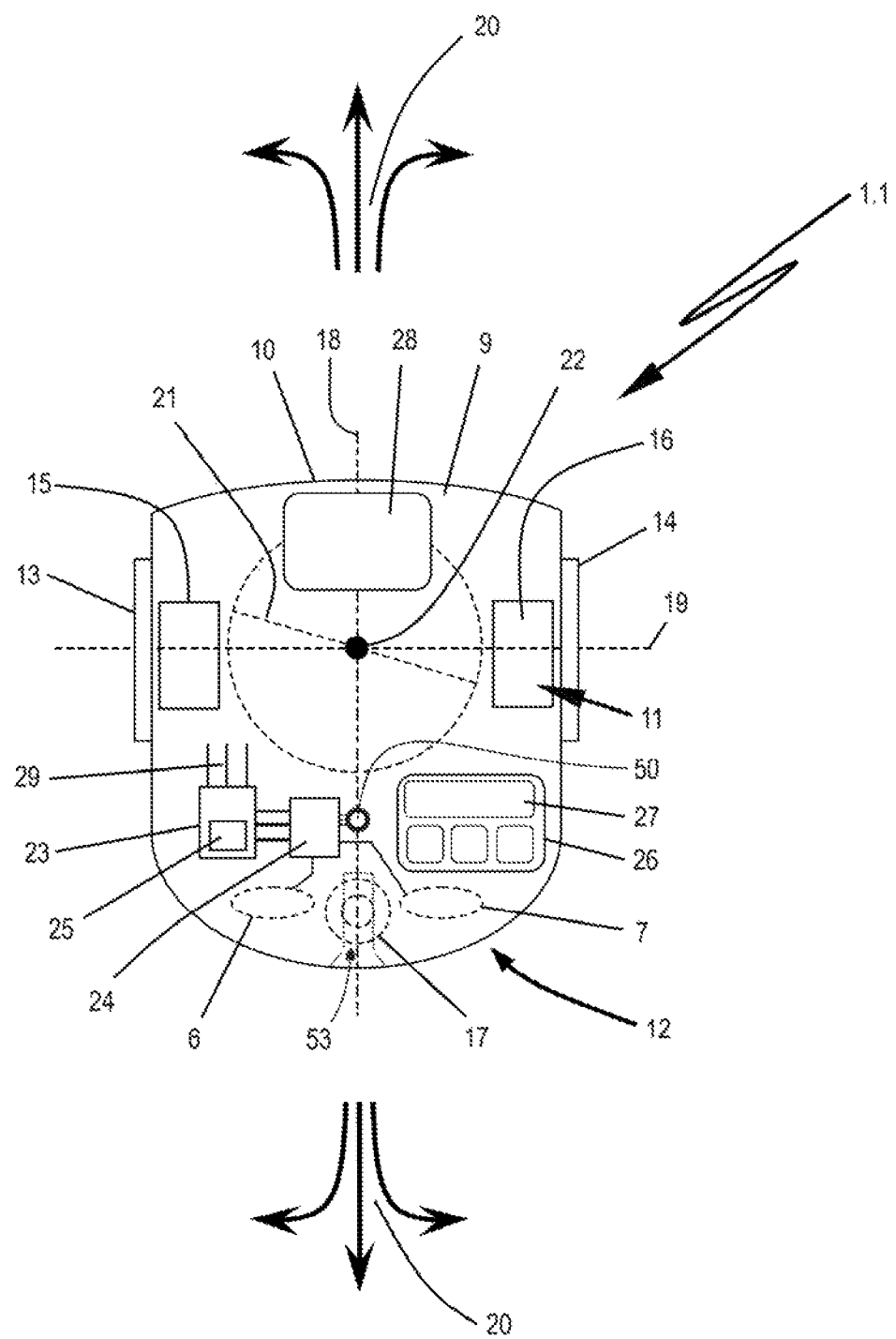
FIG. 2 shows in a schematic representation the construction of a ground working device in the example of a self-driving lawnmower; and, FIG. 3 shows in a schematic representation a control circuit for the adaptation of a wire signal transmitted on a wire of an edge boundary.

Schematically shown in plan view in FIG. 2 is a ground working device 1.1, which is configured as a lawnmower 10. The representation of the autonomously operating, self-driving lawnmower 10 is given by way of example. The ground working device 1.1 may also be configured as a scarifier, road sweeper, vacuum cleaner, autonomous ride-on lawnmower or similar ground working device.

The lawnmower 10 shown by way of example essentially includes a chassis with rear drive wheels 13, 14 and a drive 11. In the embodiment shown, each drive wheel 13, 14 is assigned an electrical drive motor 15, 16, so that the drive wheels 13 and 14 can be driven at different rotational speeds and/or in different directions of rotation for controlling the direction of the lawnmower 10. The drive 11 has two mutually independently controllable electric motors.

Provided in the front region 12 of the housing 9 of the ground working device 1.1, there is an in particular self-aligning third wheel 17. The third wheel 17 preferably lies on a longitudinal mid-axis 18 of the housing 9 of the lawnmower 10. The configuration of a chassis frame with four wheels may be expedient.

The drive wheels 13, 14 of the ground working device 1.1 shown rotate about a common drive axis 19. The drive axis 19—in the plan view of the lawnmower 10 as in FIG. 2—is in particular perpendicular to the longitudinal mid-axis 18 of the housing 9. For traveling in a straight line, the drive wheels 13 and 14 are to be driven synchronously via their electrical drive motors 15 and 16. For negotiating a curve, the drive wheels 13, 14 are driven for example with different rotational speeds by their drive motors 15, 16. Via the drive 11, the ground working device 1.1 can be moved in any desired traveling direction 20 forward or backward according to the arrows depicted.

In the embodiment as a lawnmower 10, the ground working device 1.1 as in FIG. 2 has an operating tool 21 between the drive wheels 13 and 14. In the case of a lawnmower 10, the operating tool 21 is a blade rotating about a vertical rotation axis 22.

The control of the electrical drive motors 15 and 16 is carried out via a control unit 23, which is connected via schematically indicated electrical lines 29 to the electrical drive motors 15 and 16.

The wire signal 41 transmitted on the wire 43 of the wire loop 2 of the edge boundary is received in reception coils 6 and 7 of the ground working device 1.1. The reception coils 6 and 7 lie in the front region 12 of the housing 9, respectively on one side of the longitudinal mid-axis 18 of the ground working device 1.1. The reception signals induced in the reception coils 6 and 7 on the basis of the wire signals 41 transmitted are delivered to a common evaluation unit 24, which is connected to the control unit 23. Advantageously, the control unit 23 also includes a memory 25 for an operating variable, which is expedient for operating the ground working device 1.1. Such an operating variable may be for example the start time of the operation, the duration of the operation, the cutting height (in the case of a configuration as a lawnmower), the traveling distance to a charging station, a mowing schedule as a weekly schedule or a similar operating variable.

In FIG. 2, an input pad 26, which advantageously has a screen 27 and input keys, for the user to enter information about the operating variable is shown. It may be expedient to configure the screen as a touchscreen, so that it is possible to dispense with input keys.

Each ground working device 1.1, 1.2 may also have a further receiver 50, which receives radio signals or infrared signals of a station transmitter 51. One such station transmitter 51 may for example be provided at the base station 8 of the ground working system S, as represented in FIG. 1. The station transmitter 51 transmits signals to the receiver 50 of the ground working device 1.1. This wireless communication connection between the station transmitter 51 and the receiver 50 on the ground working device 1.1 is advantageously configured as a radio link or the like. Possible radio links may be WLAN connections, Bluetooth connections, GSM connections, NFC connections or similar wireless connections. In a particular configuration, the station transmitter and the receiver are configured in such a way that transmission and reception of data is possible in both directions.

The electrical supply to the control unit 23 and to all its components, the electrical supply to the electrical drive 11 and also the electrical supply to the receiver 50 is ensured by an in-device battery 28 of the ground working device 1.1. The battery 28 is preferably inserted in the housing 9 of the ground working device 1.1.

During the operation of the ground working system S, the ground working devices 1.1 and 1.2 are made to travel independently of one another in the operating region A to be worked, as a result of corresponding control of the drive motors 15 and 16. Each individual ground working device 1.1 and 1.2 operates autonomously in accordance with the information of an operating variable stored in its memory 25.

Since, during the operation of a ground working device 1.1, 1.2, the battery charge decreases on account of the electrical loads that are operated, it is expediently provided to configure the base station 8 of the ground working system S at the same time as a charging station L, as FIG. 1 indicates. Thus, a coupling finger 52 may be provided, which enters a corresponding coupling socket 53 of the ground working device 1.1 and establishes an electrical connection for the charging of the in-device battery 28.

In order to ensure that there is a sufficiently strong wire signal 41 over the entire length of the wire 43 of the edge boundary, the wire signal 41 transmitted by the transmission unit 32 is electrically received in the reception unit 31 via the connection to the connection ends 3 and 4. The wire signal 41 transmitted on the wire 43 changes in amplitude and signal shape on the basis of the geometrical and electrical properties of the wire 43. Both the ohmic resistance of the wire 43 and inductive and capacitive properties of a laid wire loop 2 influence the wire signal 41. Furthermore, signal falsifications may occur due to interference signals.

For proper operation of the ground working system S, it must be ensured that the transmitted wire signal 41 can be reliably received by the ground working devices 1.1, 1.2 over the entire length of the wire 43 of the edge boundary, even at a distance from the wire 43. The received wire signal 42 is intended to have an amplitude and/or signal shape that ensures faultless control of the ground working devices 1.1 and 1.2 in the entire operating region in spite of line losses on the wire loop 2.

According to an aspect of the invention, it is envisaged to transmit the wire signal 42 received in the reception unit 31 over an electrical line connection 33 to a signal processing device 30. The signal processing device 30 compares the received wire signal 42 with a predetermined setpoint signal 40, which is expediently made available to the signal processing device 30 via a memory 35. The predetermined setpoint signal 40 may be a signal that complies with legal requirements and is fundamentally admissible on the wire 43 of the edge boundary. If the signal processing device 30 establishes deviations from the predetermined setpoint signal 40, control commands by which the wire signal 41 to be transmitted is changed in its amplitude I, its frequency, its signal shape or similar signal variables are passed on to the transmission unit 32 via a line connection 34. The transmitted wire signal 41 is modified in accordance with the control commands and transmitted on the wire loop 2.

The transmitted wire signal 41 is electrically picked up in the reception unit 31 by the connection ends 3, 4 of the wire loop 2 and once again received. The received wire signal 42 is made available via the line connection 33 to the signal processing device 30 and compared by the latter with the predetermined setpoint signal 40. If deviations from the setpoint signal 40 are still established, variables of the signal (amplitude, signal shape, variation over time) are once again changed and the thus modified wire signal 41 is transmitted once again via the connection ends 3, 4 of the wire 43 of the wire loop 2. The transmission unit 32, the wire 43 of the wire loop 2, the reception unit 31 and the signal processing device 30 form a control circuit, in particular a closed control circuit. The adaptation of the transmitted wire signal 41 continues until the received wire signal 42 approximates to the predetermined setpoint signal 40, preferably corresponds to the setpoint signal 40. It should be emphasized that the transmitted wire signal 41 and the predetermined setpoint signal 40 may be formed differently in amplitude I and/or signal shape.

Further advantageous embodiments are provided by any desired combinations of the features specified and the embodiments described.

It is understood that the foregoing description is that of the preferred embodiments of the invention and that various changes and modifications may be made thereto without departing from the spirit and scope of the invention as defined in the appended claims.

What is claimed is:

1. A ground working system comprising:
at least one self-driving ground working device having a drive, a reception coil and a control unit;
a wire delimiting an operating region (A);
said at least one self-driving ground working device being configured to travel along a traveling path (W) determined by said control unit in said operating region (A);
a base station having a transmission unit configured to be electrically connected to the wire and via which a wire signal is transmitted on said wire, wherein said wire signal generates an electromagnetic field and said electromagnetic field of said wire signal induces a reception signal in said reception coil of said at least one self-driving ground working device;
said control unit being configured to process said reception signal;
said base station having a reception unit for electrically-receiving said wire signal transmitted on said wire as a received wire signal;
wherein said received wire signal is compared with a predetermined setpoint signal;

wherein, in the event of a deviation of the electrically received wire signal from said predetermined setpoint signal, the wire signal transmitted on said wire is changed; and, wherein said wire signal transmitted on said wire and said predetermined setpoint signal are different in at least one of amplitude (I) and signal shape.

2. The ground working system of claim 1, wherein said wire signal transmitted on said wire is changed in such a manner that said received wire signal is adapted to said predetermined setpoint signal.

3. The ground working system of claim 1, wherein said wire is laid as a wire loop forming an edge boundary of said operating region (A).

4. The ground working system of claim 3, wherein:
said wire loop has connection ends; and,
said wire loop is electrically connected at said connection ends to said transmission unit.

5. The ground working system of claim 4, wherein said wire loop is electrically connected at said connection ends to a reception unit.

6. The ground working system of claim 5 further comprising:
a signal processing device; and,
said reception unit being connected to said transmission unit via said signal processing device.

7. The ground working system of claim 1, wherein said wire signal transmitted on said wire is changed in signal shape.

8. The ground working system of claim 1, wherein said base station is configured as a charging station (L) for a battery of said at least one self-driving ground working device.

9. The ground working system of claim 1, wherein said at least one self-driving ground working device is a self-driving lawnmower.

10. A ground working system comprising: at least one self-driving ground working device having a drive, a reception coil and a control unit;

a wire delimiting an operating region (A);

said at least one self-driving ground working device being configured to travel along a traveling path (W) determined by said control unit in said operating region (A);

a base station having a transmission unit configured to be electrically connected to the wire and via which a wire signal can be transmitted on said wire, wherein said wire signal generates an electromagnetic field and said electromagnetic field of said wire signal induces a reception signal in said reception coil of said at least one self-driving ground working device;

said control unit being configured to process said reception signal;

said base station having a reception unit for electrically receiving said wire signal transmitted on said wire as a received wire signal;

wherein said received wire signal is compared with a predetermined setpoint signal;

wherein, in the event of a deviation of the electrically-received wire signal from said predetermined setpoint signal, the wire signal transmitted on said wire is changed; and, wherein said wire signal transmitted on said wire is electrically increased in amplitude (I).

\* \* \* \* \*

UNITED STATES PATENT AND TRADEMARK OFFICE
CERTIFICATE OF CORRECTION

PATENT NO. : 10,820,493 B2
APPLICATION NO. : 15/997346
DATED : November 3, 2020
INVENTOR(S) : Ritzer et al.

It is certified that error appears in the above-identified patent and that said Letters Patent is hereby corrected as shown below:

On the Title Page

Item (56), Line 1, Under OTHER PUBLICATIONS: delete "Husgvama" and substitute -- Husqvarna -- therefor.

On page 2 In Column 1:
Line 8, Under U.S. PATENT DOCUMENTS: delete "Shamilian" and substitute -- Shamlian -- therefor.

In the Specification

In Column 4:
Line 1: delete "reception" and substitute -- transmission -- therefor.
Line 3: delete "transmission" and substitute -- reception -- therefor.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*